US011598172B2

(12) United States Patent
Whitehead

(10) Patent No.: US 11,598,172 B2
(45) Date of Patent: Mar. 7, 2023

(54) ROTATING HEAD WITH BYPASS CIRCUIT

(71) Applicant: The SydCo System, Inc., Foss, OK (US)

(72) Inventor: Tyler Whitehead, Foss, OK (US)

(73) Assignee: The SydCo System, Inc., Foss, OK (US)

( * ) Notice: Subject to any disclaimer, the term of this patent is extended or adjusted under 35 U.S.C. 154(b) by 213 days.

(21) Appl. No.: 17/157,213

(22) Filed: Jan. 25, 2021

(65) Prior Publication Data
US 2022/0235800 A1   Jul. 28, 2022

(51) Int. Cl.
*E21B 33/08* (2006.01)
*E21B 33/035* (2006.01)
*E21B 33/064* (2006.01)
*F15B 20/00* (2006.01)

(52) U.S. Cl.
CPC .......... *E21B 33/064* (2013.01); *E21B 33/035* (2013.01); *E21B 33/08* (2013.01); *E21B 33/085* (2013.01); *F15B 20/007* (2013.01); *F15B 2211/45* (2013.01)

(58) Field of Classification Search
CPC ...... E21B 23/02; E21B 33/035; E21B 33/064; E21B 33/08; E21B 33/085; E21B 33/1294; F15B 2211/45
See application file for complete search history.

(56) References Cited

U.S. PATENT DOCUMENTS

| 2,507,868 | A | * | 5/1950 | Purcell | .................. | B30B 15/161 |
| | | | | | | 91/461 |
| 2,684,166 | A | | 7/1954 | Jarnett | | |
| 4,154,448 | A | | 5/1979 | Biffle | | |
| 4,304,310 | A | | 12/1981 | Garrett | | |
| 4,416,340 | A | * | 11/1983 | Bailey | .................. | E21B 33/085 |
| | | | | | | 285/365 |
| 4,529,210 | A | | 7/1985 | Biffle | | |
| 5,647,444 | A | * | 7/1997 | Williams | .............. | E21B 33/085 |
| | | | | | | 166/84.1 |
| 5,662,181 | A | * | 9/1997 | Williams | .............. | E21B 33/085 |
| | | | | | | 166/84.3 |
| 6,138,774 | A | * | 10/2000 | Bourgoyne, Jr. | ..... | E21B 21/106 |
| | | | | | | 175/7 |

(Continued)

FOREIGN PATENT DOCUMENTS

DE        4141205 A1 *  6/1993  ............ F15B 11/042

*Primary Examiner* — Kenneth Bomberg
*Assistant Examiner* — Matthew Wiblin
(74) *Attorney, Agent, or Firm* — Dunlap Codding, P.C.

(57) ABSTRACT

A rotating head assembly includes a body, an implement, a clamp assembly, a drive member, a hydraulic motor, and a bypass circuit. The drive member is threadingly connected to a first clamp member and a second clamp member. The hydraulic motor is connected to the drive member to cause the drive member to rotate in a selected direction. An inlet of the bypass circuit is in fluid communication with an inlet of the hydraulic motor to receive a portion of the pressurized hydraulic fluid passing to the hydraulic motor. An outlet of the bypass circuit is in fluid communication with the outlet of the hydraulic motor. At least one bypass valve is interposed between the inlet of the bypass circuit and the outlet of the bypass circuit. The bypass valve has an actuator positioned adjacent one of the first clamp member and the second clamp.

12 Claims, 6 Drawing Sheets

(56) References Cited

U.S. PATENT DOCUMENTS

| 8,739,863 B2 | 6/2014 | Linde et al. |
| 2012/0125633 A1 | 5/2012 | Linde et al. |
| 2012/0125636 A1 | 5/2012 | Linde et al. |

* cited by examiner

ROTATING HEAD WITH BYPASS CIRCUIT

BACKGROUND

Oil, gas, water, and geothermal wells are drilled with a drill bit attached to a hollow, rotating drill string. The drill string passes down through a well casing installed in a well bore. A rotating control device, or "rotating head," is a pressure sealing device typically installed near the surface above a blowout prevention stack. The rotating head creates a seal around the rotating drill string to keep drilling fluids from flowing to the rig floor or releasing into the atmosphere. The head thus permits the forced circulation of drilling fluid or gas during drilling operations.

Rotating heads typically include a tubular, stationary body that carries a variety of drilling implements. For example, a commonly used implement is a bearing assembly with roller bearings and at least one annular rubber seal configured to allow the drill string to rotate within the body. The rotating head further includes a clamp assembly to secure the implement disposed within the body. The clamp assembly often has two clamp members hinged on one side and a drive member, such as a threaded bolt, opposite the hinge. The drive member extends between the clamp members for moving the clamp assembly between open and closed positions. Prior art also discloses the clamp assembly as having two clamp members and two drive members connecting the clamp members opposite each other. In either embodiment, the position of the clamp members around the implement can be adjusted either manually or using a motor. For example, a hydraulic motor can be connected to the drive member for opening and closing the clamp.

Drilling operations require the clamp be open when access to the implement or the drill string is needed for maintenance or repairs. The clamp is opened by sending pressurized hydraulic fluid to the motor so the drive member is rotated in a selected direction, thereby separating the clamp members. However, operators often cause the clamp assembly to jam or bind up during opening by sending excessive pressurized hydraulic fluid to the motor. Further, over-operation of the hydraulic motor has led to leaks and inadvertent machine contact, which have caused damage to equipment and loss profits from rig downtime.

To this end, a need exists for a rotating head with a bypass circuit that overcomes the problems of the prior art. It is to such a rotating head that the inventive concepts disclosed herein are directed.

SUMMARY OF THE INVENTIVE CONCEPTS

In accordance with an aspect of the inventive concepts, a rotating head assembly is disclosed. The rotating head assembly includes a body, an implement, a clamp assembly, a drive member, a hydraulic motor, and a bypass circuit. The body has a lower portion, an intermediate portion, an upper portion, and a bore extending entirely through the body from the upper portion to the lower portion. The lower portion is connectable to a well bore. The intermediate portion has at least one opening in communication with the bore. The implement is positioned in the bore of the body. The clamp assembly is connected to the upper portion of the body and has a first clamp member and a second clamp member. The first and second clamp members are movable between an open position wherein the first and second clamp members are spaced to permit the implement to be inserted into and removed from the body and a closed position wherein the first and second clamp members are positioned to secure the implement to the body. The drive member is threadingly connected to the first clamp member and the second clamp member. The hydraulic motor is connected to the drive member in a way to cause the drive member to rotate in a selected direction to move the first and second clamp members between the open position and the closed position. The hydraulic motor has an inlet connectable to a source of pressurized fluid and an outlet. The bypass circuit has an inlet, an outlet, and at least one bypass valve. The inlet is in fluid communication with the inlet of the hydraulic motor to receive a portion of the pressurized hydraulic fluid passing to the hydraulic motor. The outlet is in fluid communication with the outlet of the hydraulic motor. The at least one bypass valve is interposed between the inlet of the bypass circuit and the outlet of the bypass circuit. The at least one bypass valve has an actuator positioned adjacent one of the first clamp member and the second clamp member so the at least one bypass valve is caused to open when the one of the first clamp member and the second clamp member engages the actuator of the at least one bypass valve. Upon the at least one bypass valve being open, the pressurized hydraulic fluid is caused to bypass the hydraulic motor thereby deactivating the hydraulic motor.

In accordance with a further aspect of the inventive concepts, another embodiment of a rotating head assembly is disclosed. The rotating head assembly includes a body, an implement, a clamp assembly, a drive member, a hydraulic motor, and a bypass circuit. The body has a lower portion, an intermediate portion, an upper portion, and a bore extending entirely through the body from the upper portion to the lower portion. The lower portion is connectable to a well bore. The intermediate portion has at least one opening in communication with the bore. The implement is positioned in the bore of the body. The clamp assembly is connected to the upper portion of the body and has a first clamp member and a second clamp member. The first and second clamp members are movable between an open position wherein the first and second clamp members are spaced to permit the implement to be inserted into and removed from the body and a closed position wherein the first and second clamp members are positioned to secure the implement to the body. The drive member is threadingly connected to the first clamp member and the second clamp member. The hydraulic motor is connected to the drive member in a way to cause the drive member to rotate in a selected direction to move the first and second clamp members between the open position and the closed position. The hydraulic motor has an inlet connectable to a source of pressurized fluid and an outlet. The bypass circuit has an inlet, an outlet, a first bypass valve, and a second bypass valve. The inlet is in fluid communication with the inlet of the hydraulic motor to receive a portion of the pressurized hydraulic fluid passing to the hydraulic motor. The outlet is in fluid communication with the outlet of the hydraulic motor. The first bypass valve is interposed between the inlet of the bypass circuit and the outlet of the bypass circuit. The first bypass valve has an actuator positioned adjacent the first clamp member so the first bypass valve is caused to open when the first clamp member engages the actuator of the first bypass valve. The second bypass valve is interposed between the inlet of the bypass circuit and the outlet of the bypass circuit. The second bypass valve has an actuator positioned adjacent the second clamp member so the second bypass valve is caused to open when the second clamp member engages the actuator of the second bypass valve. Upon the first bypass valve and the second bypass valve being open, the pressurized hydraulic fluid is caused to bypass the hydraulic motor thereby deactivating the hydraulic motor.

In accordance with a further aspect of the inventive concepts, another embodiment of a rotating head assembly is disclosed. The rotating head assembly includes a body, an implement, a clamp assembly, a drive member, a hydraulic power circuit, and a bypass circuit. The body has a lower portion, an intermediate portion, an upper portion, and a bore extending entirely through the body from the upper portion to the lower portion. The lower portion is connectable to a well bore. The intermediate portion has at least one opening in communication with the bore. The implement is positioned in the bore of the body. The clamp assembly is connected to the upper portion of the body and has a first clamp member and a second clamp member. The first and second clamp members are movable between an open position wherein the first and second clamp members are spaced to permit the implement to be inserted into and removed from the body and a closed position wherein the first and second clamp members are positioned to secure the implement to the body. The drive member is threadingly connected to the first clamp member and the second clamp member. The hydraulic power circuit is connected to the clamp assembly in a way to move the first clamp member and the second clamp member between the open position and the closed position. The hydraulic power circuit includes a hydraulic motor, a source of hydraulic fluid, and a pump. The hydraulic motor is connected to the drive member in a way to cause the drive member to rotate in a selected direction to move the first clamp member and the second clamp member between the open position and the closed position. The hydraulic motor has an inlet and an outlet. The source of hydraulic fluid is in fluid communication with the inlet and outlet of the hydraulic motor. The pump is interposed between the source of hydraulic fluid and the inlet of the hydraulic motor to supply pressurized hydraulic fluid to the hydraulic motor. The bypass circuit has an inlet, an outlet, a first bypass valve, and a second bypass valve. The inlet is in fluid communication with the inlet of the hydraulic motor to receive a portion of the pressurized hydraulic fluid passing to the hydraulic motor. The outlet is in fluid communication with the outlet of the hydraulic motor. The first bypass valve is interposed between the inlet of the bypass circuit and the outlet of the bypass circuit. The first bypass valve has an actuator positioned adjacent the first clamp member so the first bypass valve is caused to open when the first clamp member engages the actuator of the first bypass valve. The second bypass valve is interposed between the inlet of the bypass circuit and the outlet of the bypass circuit. The second bypass valve has an actuator positioned adjacent the second clamp member so the second bypass valve is caused to open when the second clamp member engages the actuator of the second bypass valve. Upon the first bypass valve and the second bypass valve being open, the pressurized hydraulic fluid is caused to bypass the hydraulic motor thereby deactivating the hydraulic motor.

In accordance with a further aspect of the inventive concepts, a method is disclosed. The method includes obtaining a rotating head, supplying pressurized hydraulic fluid, and causing the pressurized hydraulic fluid to bypass a motor. The rotating head has a body, an implement, and a clamp assembly. The body has a lower portion, an intermediate portion, an upper portion, and a bore extending entirely through the body from the upper portion to the lower portion. The lower portion is connectable to a well bore and the intermediate portion has at least one opening in communication with the bore. The implement is positioned in the bore of the body. The clamp assembly is connected to the upper portion of the body and has a first clamp member and a second clamp member. The first and second clamp members are movable between an open position wherein the first and second clamp members are spaced to permit the implement to be inserted into and removed from the body and a closed position wherein the first and second clamp members are positioned to secure the implement in the body. Pressurized hydraulic fluid is supplied to a hydraulic motor to cause the hydraulic motor to rotate a drive member threadingly connected to the first clamp member and the second clamp member in a way that causes the first clamp member and the second clamp member to move to the open position. The pressurized hydraulic fluid is caused to bypass the hydraulic motor upon at least one of the first clamp member and the second clamp member moving to a selected position.

DETAILED DESCRIPTION OF EXEMPLARY EMBODIMENTS

Figure 1:
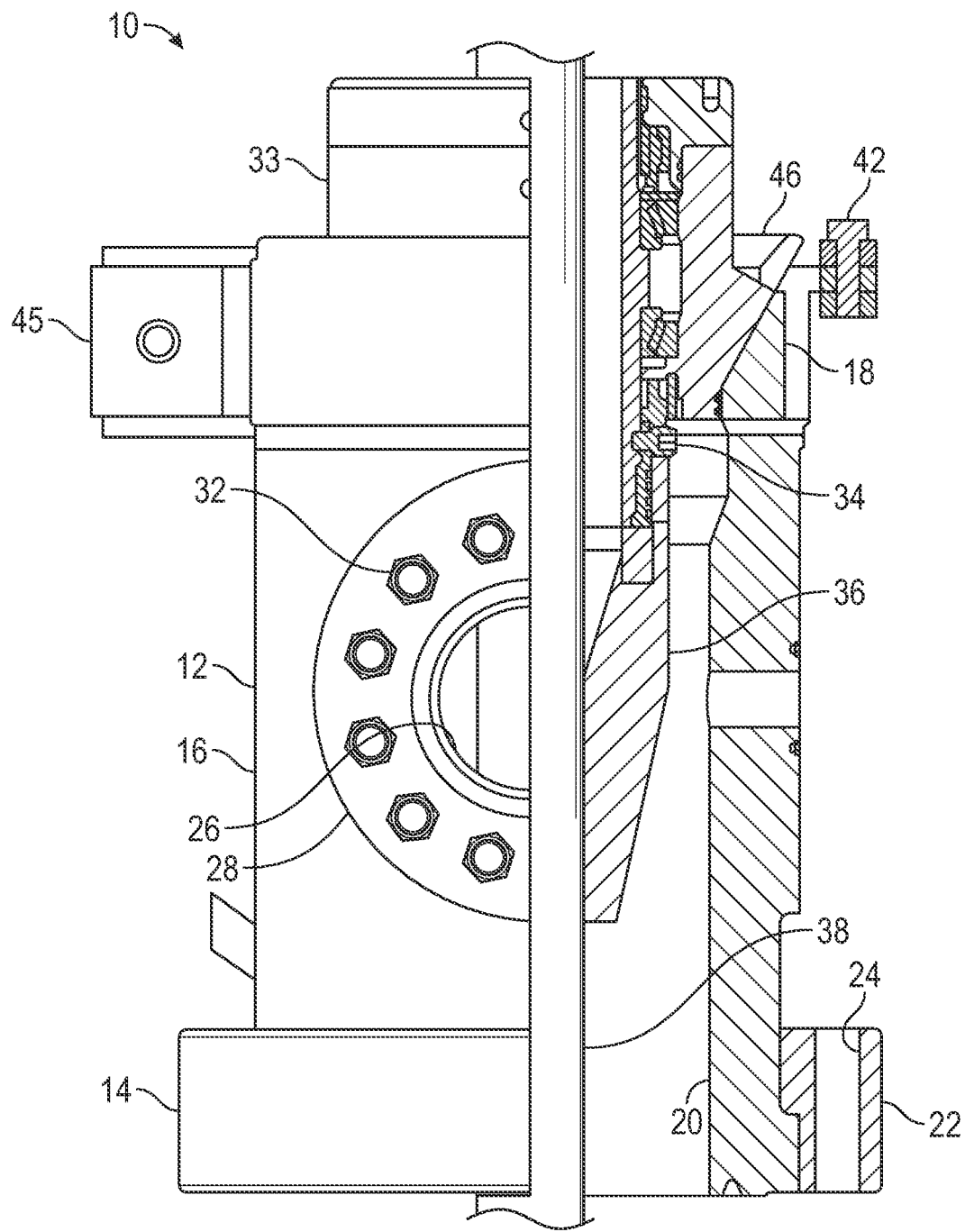
FIG. 1 is a partially cross-sectional view of a prior art rotating head.

Before explaining at least one embodiment of the inventive concepts disclosed, it is to be understood that the inventive concepts are not limited in their application to the details of construction and the arrangement of the components or steps or methodologies in this description or illustrated in the drawings. The inventive concepts disclosed are capable of other embodiments or of being practiced or carried out in various ways. Also, it is to be understood that the phraseology and terminology employed is for description only and should not be regarded as limiting the inventive concepts disclosed and claimed herein.

In this detailed description of embodiments of the inventive concepts, numerous specific details are set forth in order to provide a more thorough understanding of the inventive concepts. However, it will be apparent to one of ordinary skill in the art that the inventive concepts within the disclosure may be practiced without these specific details. In other instances, well-known features may not be described to avoid unnecessarily complicating the disclosure.

Further, unless stated to the contrary, "or" refers to an inclusive "or" and not to an exclusive "or." For example, a condition A or B is satisfied by anyone of: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concepts disclosed. This description should be read to include one or at least one and the singular also includes the plural unless it is obvious that it is meant otherwise.

As used herein any reference to "one embodiment" or "an embodiment" means that a particular element, feature, structure, or characteristic described in the embodiment is included in at least one embodiment. The appearances of the phrase "in one embodiment" in various places in the specification are not necessarily all referring to the same embodiment.

Figure 2:
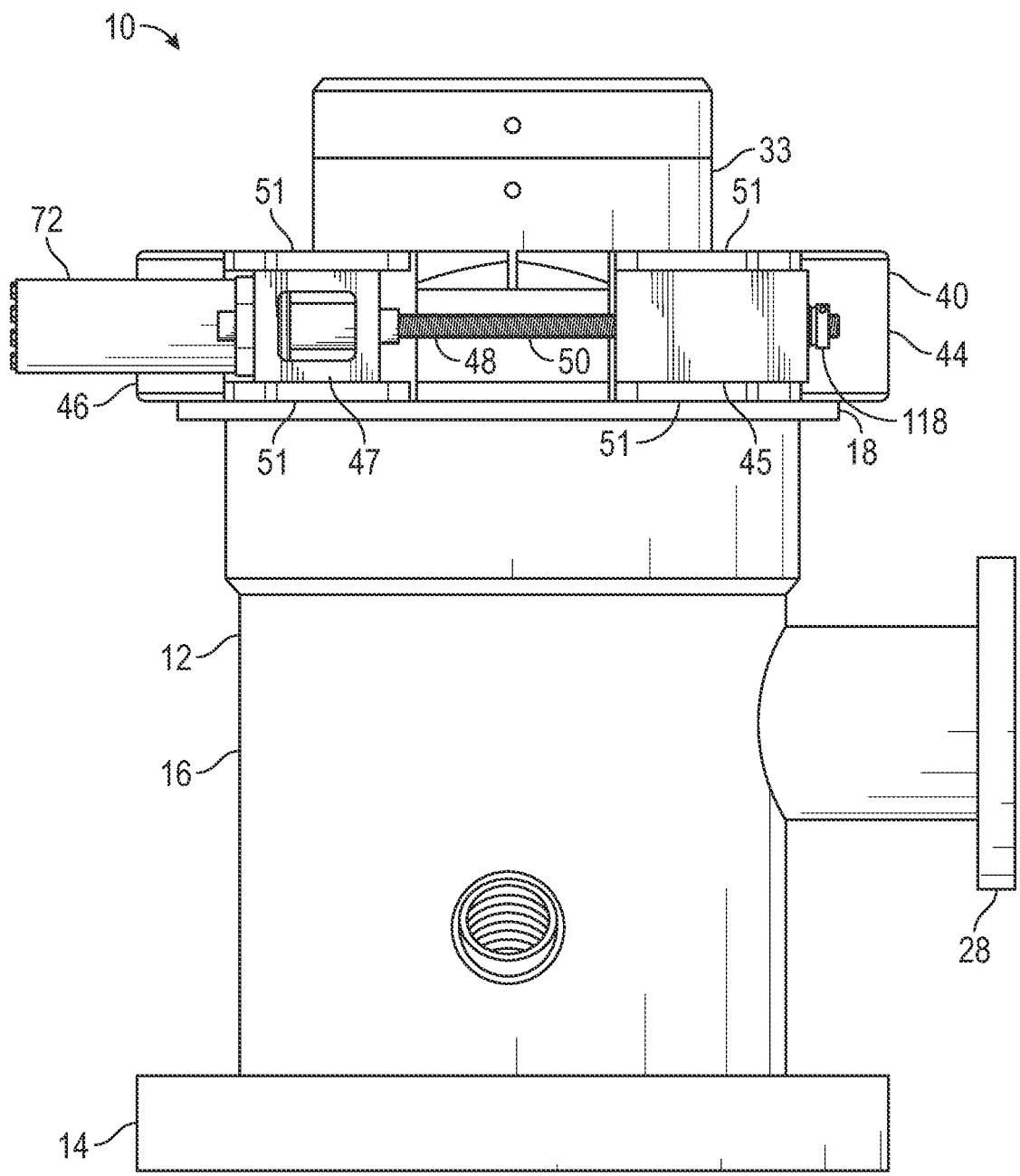
FIG. 2 is a front view of the prior art rotating head of FIG. 1.

Referring to the drawings, and more particularly to FIGS. 1 and 2, a rotating head assembly 10 constructed in accordance with the inventive concepts disclosed herein is shown. The rotating head assembly 10 has a body 12 including a lower portion 14, an intermediate portion 16, an upper portion 18, and a bore 20 extending entirely through the body 12 from the upper portion 18 to the lower portion 14. Rotating head bodies are generally known to be tubular in shape, but other shapes including, but not limited to, rectangular and oval, are anticipated. The body 12 may also have a tapered shape so inner and/or outer radii of the lower portion 14, the intermediate portion 16, and upper portion 18 may differ. For example, an inner radius of the upper portion 18 may be greater than an inner radius of the intermediate portion 16 creating a bowl-like shape within the bore 20 of the body 12 for supporting inserted implements later described. Further, rotating head bodies are typically metal but could conceivably be made of a variety of materials including, but not limited to, metal, composite, plastic, or a combination thereof, so the body is rigid, impact resistant, and corrosive resistant.

The lower portion 14 of the body 12 is connectable to a well bore. Connections to the well bore are most commonly nut and bolt. The lower portion may also have a flange 22 with connection bores 24 configured to support the connection to the well bore. For example, in one embodiment, at least one threaded bolt may extend from the well bore through connection bores 24 onto which at least one nut can be connected securing the body 12 to the well bore. However, it will be appreciated that many methods of attachment exist, such as various clamps and couplings, that might serve this function and the inventive concepts disclosed herein are not limited to the disclosed attachment method.

The intermediate portion 16 has at least one opening 26 in communication with the bore 20. The openings 26 may be conduits, such as flange portion 28 or couple portion 30 protruding from the intermediate portion 16, so the rotating head assembly 10 can be connected to additional components of the drilling operation. For example, the rotating head assembly 10 may also attach to hoses or lines in fluid communication with a mud pit. Other drilling operation components for transferring materials such as drilling fluids through the rotating head are well known to those in the art and are anticipated.

Similar to the connection of the lower portion 14, in one embodiment, at least one of openings 26 may have connection bores 32 through which a bolt may extend with a nut connectable thereon. The connection bores 32 may be on a flange portion 28. Another opening 26 may have a slip-on couple such as couple portion 30. However, it will be appreciated that many methods of attachment exist, such as various clamps and couplings, that might serve this function and the inventive concepts disclosed herein are not limited to the disclosed attachment method.

Implements 33, such as the depicted bearing assembly 34 and annular seal 36, may be placed within the bore 20 of the body 12. For example, bearing assemblies are commonly used to allow the drill string to rotate within the bore 20 of the body 12 while rubber seals 36 of the bearing assembly seal 34 an opening between the body 12 of the rotating head assembly 10 and a tubular string 38. Other implements include logging adapters used for LWD, seal plugs, and drilling nipples. The inventive concepts disclosed herein are not limited by the implement 33 placed within the body 12 as many implements are known to those of ordinary skill to be included as a part of the drilling operation.

Figure 3:
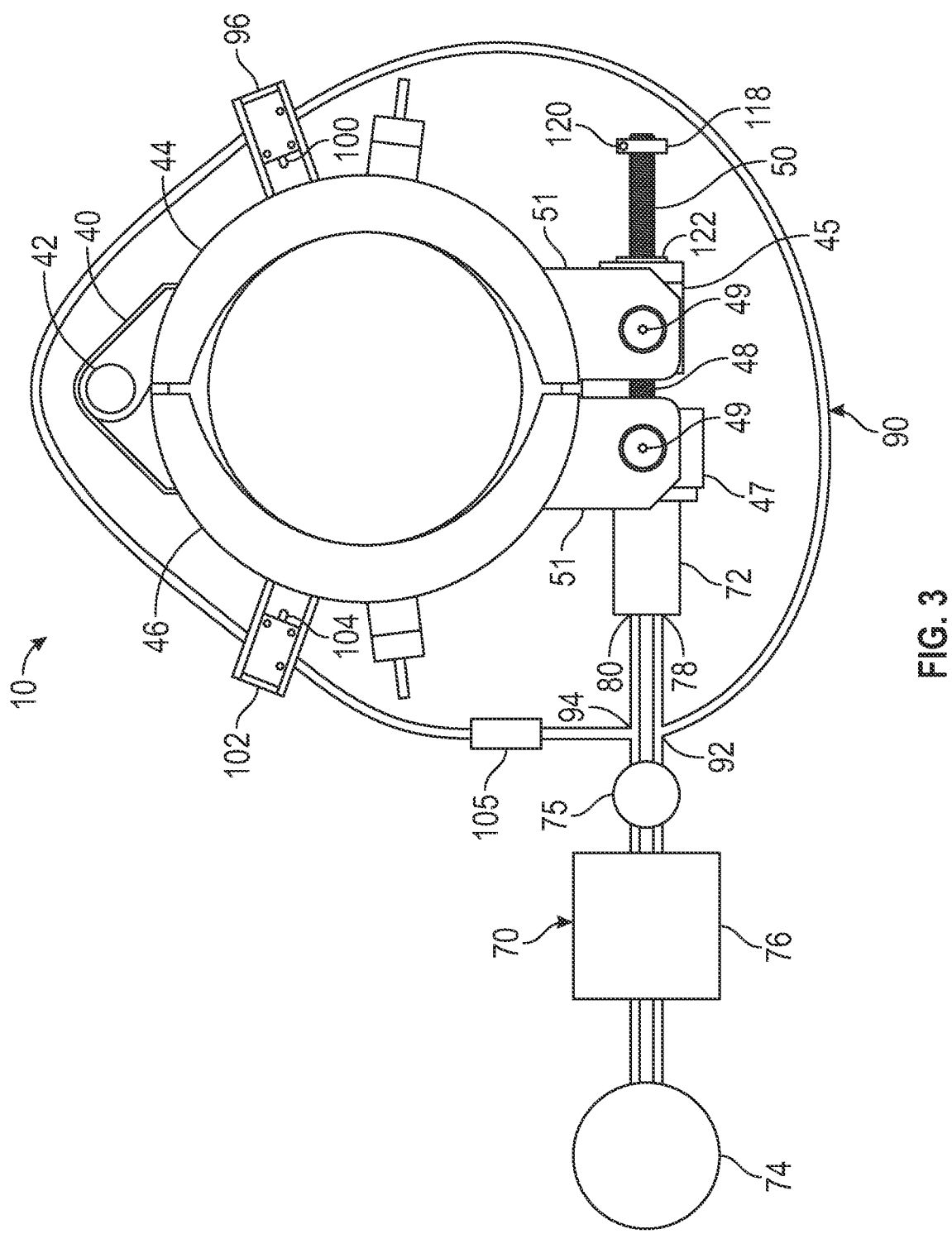
FIG. 3 is a top view of the rotating head of FIG. 1 with a bypass circuit constructed in accordance with the inventive concepts disclosed herein illustrated in a closed position.
Figure 4:
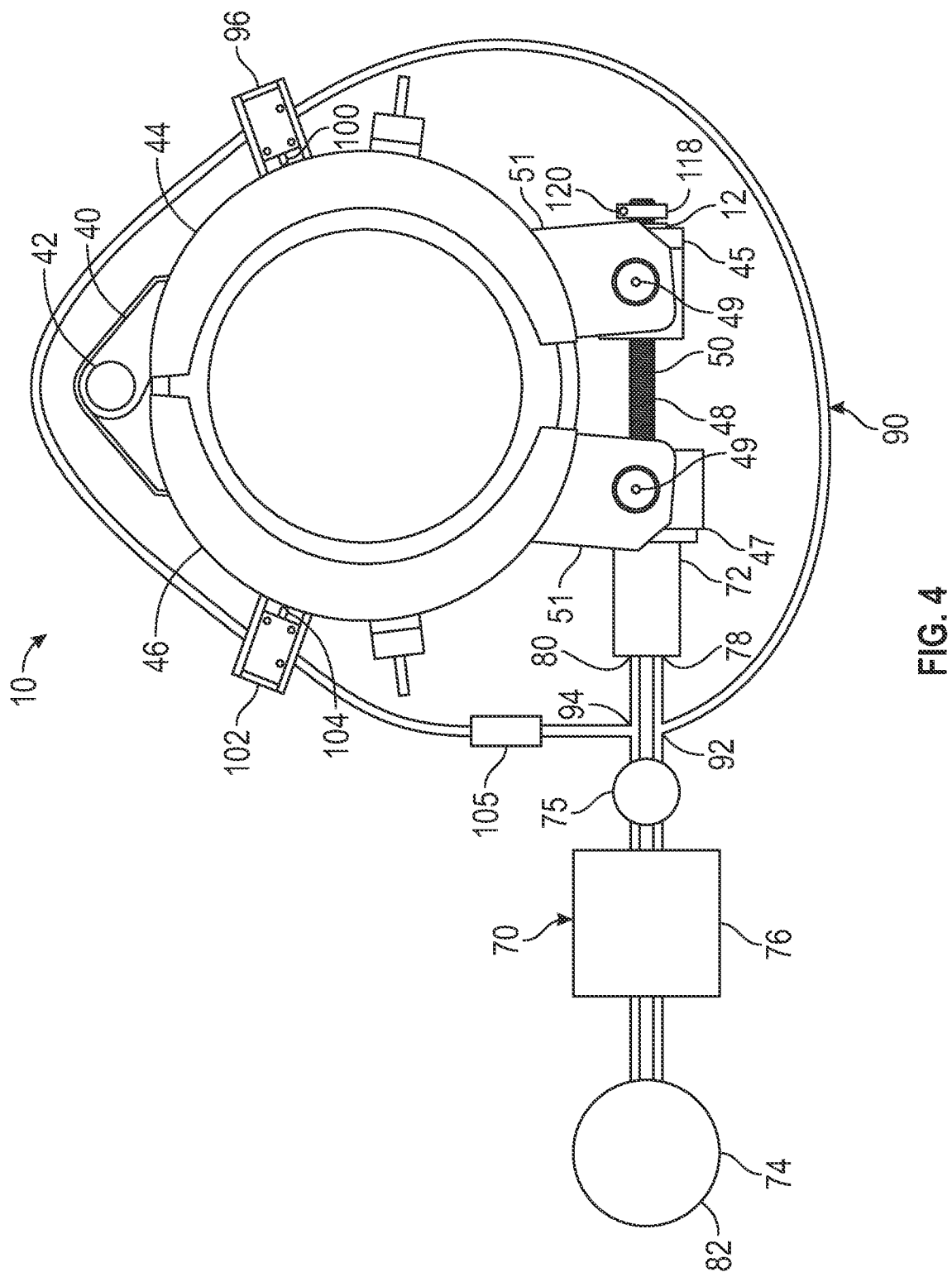
FIG. 4 is a top view of the rotating head illustrating the bypass circuit in an open position.
Figure 5:
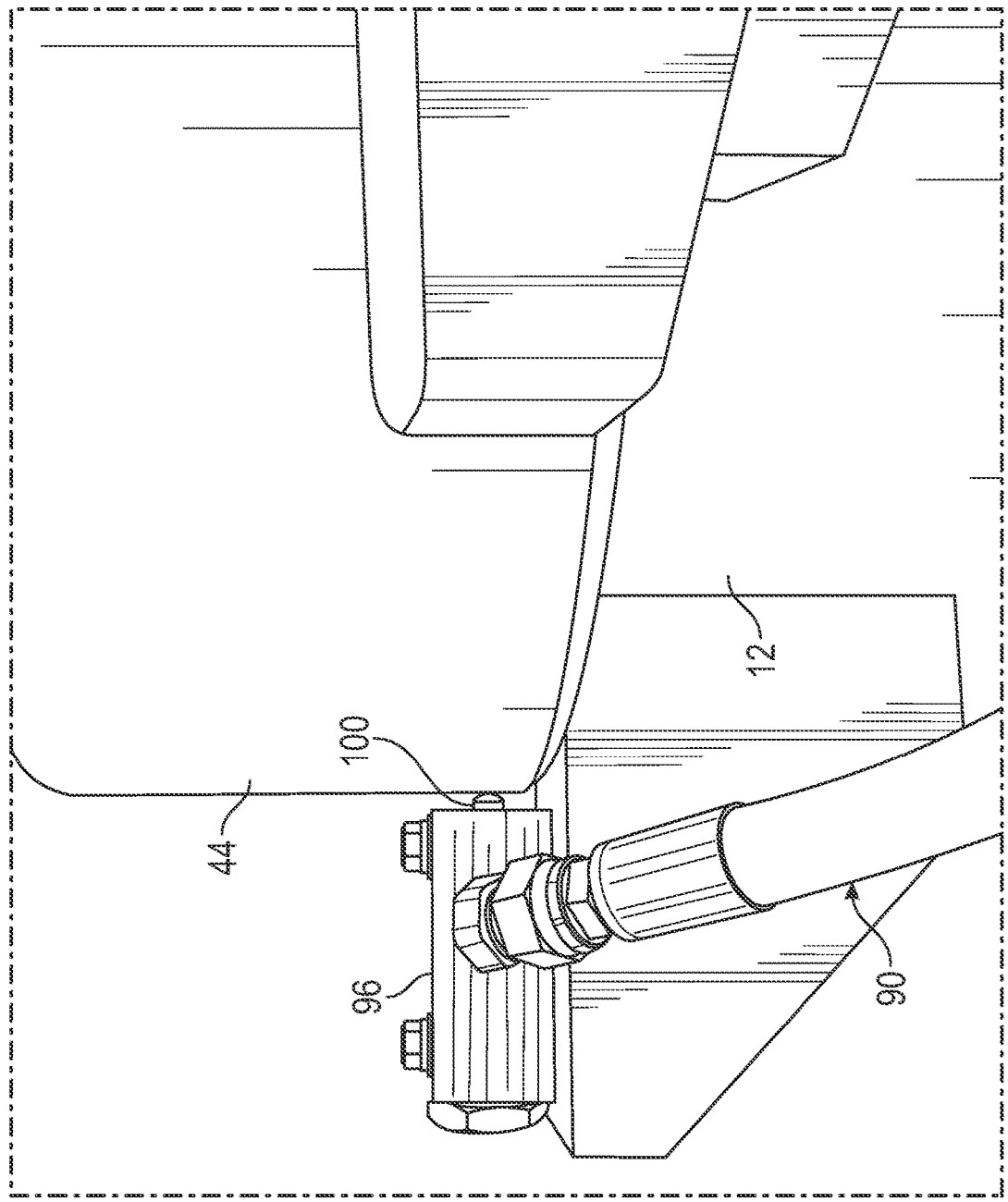
FIG. 5 is a perspective view of a bypass valve.

Referring now to FIGS. 1-4, a clamp assembly 40 is connected to the upper portion 18 of the body 12. The clamp assembly 40 may be connected to the upper portion 18 in several ways, including by a hinge bolt 42. However, it will be appreciated that many methods of attachment exist, such as various clamps and couplings, that might serve this function and the inventive concepts disclosed herein are not limited to the disclosed attachment method. The clamp assembly 40 may have a first clamp member 44 and a second clamp member 46. However, it will be understood that the present invention is not limited by the number of clamp members. In one embodiment, the clamp members 44, 46 are hinged by the hinge bolt 42. The clamp members 44, 46 are movable between an open position (FIG. 3) and a closed position (FIGS. 1, 2, and 4). In the open position, the first clamp member 44 and the second clamp member 46 are spaced to permit the implement 33 to be inserted into and removed from the body 12. In the closed position, the first clamp member 44 and the second clamp member 46 are positioned to secure the implement 33 in the body 12.

In one embodiment, the clamp members 44, 46 are semi-circular in shape to secure the implement 33 within the tubular body 12 in the closed position. However, it is understood that the clamp members 44, 46 may be a variety of shapes including, but not limited to, rectangular and oval, to secure the implement 33. The clamp members 44, 46 may also have a tapered shape (forming a bowl-like shape in the closed position) to allow the clamp assembly 40 to at least partially support the implement 33. Further, the clamp members 44, 46 may be made of metal. However, it is anticipated that the clamp members 44, 46 may also be made of a variety of materials including, but not limited to, metal, composite, plastic, or a combination thereof, so the clamp members are rigid, impact resistant, and corrosive resistant.

A drive member 48 operably connects the first clamp member 44 and the second clamp member 46. In one embodiment, the drive member 48 is a threaded bolt 50 (FIGS. 2-4). However, it is understood that many methods of threaded connection exist, and the inventive concepts directed to herein are not limited to a threaded bolt. The drive member 48 may be connected to the first clamp member 44 and the second clamp member 46 in such a way that selected rotation of the drive member 48 causes the first clamp member 44 and the second clamp member 46 to move between the closed position and the open position. For example, the drive member 48 may be a threaded bolt 50 threaded in opposite directions on opposing ends to match threads of the first and second clamp members 44, 46 respectively. The drive member 48 may also be made of metal. However, it is anticipated that the drive member 48 may be may of a variety of materials including, but not limited to, metal, composite, plastic, or a combination thereof, so the drive member 48 is sufficiently rigid, impact resistant, and corrosive resistant.

In one embodiment, the first clamp member 44 and the second clamp member 46 have a travel block 45 and a travel block 47, respectively. The travel blocks 45, 47 may be pivotally connected to the first and second clamp members 44, 46 using bolts 49. The first and second clamp members 44, 46 may also have flanges 51 wherein the travel blocks 45 and 47 may be pivotally connected between the flanges using bolts 49. However, it is understood that many methods of attachment exist that might serve this function and the inventive concepts disclosed herein are not limited by the disclosed attachment method. The travel blocks 45, 47 may be made of a durable material such as steel. However, it is anticipated that the travel blocks may be may of a variety of materials including, but not limited to, metal, composite, plastic, or a combination thereof, so the travel blocks 45, 47 are sufficiently rigid, impact resistant, and corrosive resistant. The drive member 48 may be connected to the travel blocks 45, 47 in such a way that selected rotation of the drive member 48 causes the first clamp member 44 and the second clamp member 46 to move between the closed position and the open position. For example, the drive member 48 may be threaded bolt 50 threaded in opposite directions on opposing ends to match threads of the first and second clamp travel blocks 45, 47 respectively.

Referring now to FIGS. 3-6, the rotating head assembly 10 further includes a hydraulic power circuit 70. The hydraulic power circuit 70 is connected to the clamp assembly 40 in a way to move the first clamp member 44 and the second clamp member 46 between the open position and the closed position. The hydraulic power circuit 70 includes a hydraulic motor 72, a source of hydraulic fluid 74, a control valve 75, and a pump 76. The source of hydraulic fluid 74 is in fluid communication with an inlet 78 and an outlet 80 of the hydraulic motor 72. The source of hydraulic fluid 74 may be a fluid reservoir, such as reservoir 82.

The pump 76 of the hydraulic power circuit 70 is interposed between the source of the hydraulic fluid 74 and the inlet 78 of the hydraulic motor 72 to supply pressurized hydraulic fluid to the hydraulic motor 72. Upon activation of the pump 76 and positioning of the control valve 75, hydraulic fluid is moved from the source of hydraulic fluid 74 to the hydraulic motor 72 to cause the drive member 48 to rotate in a way that move the first clamp member 44 and the second clamp member 46 from the closed position to the open position. Upon passing through the hydraulic motor 72, the hydraulic fluid returns to the source of hydraulic fluid 74. To move the first clamp member 44 and the second clamp member 46 from the open position to the closed position, the control valve is positioned accordingly to cause the hydraulic fluid to travel through the hydraulic power circuit 70 in the opposite direction. The workings of hydraulic fluid reservoirs, hydraulic pumps, control valve, and hydraulic motors are well known to those in the art. The inventive concepts directed to herein are not limited by the type of hydraulic reservoir, pump, or motor used.

The rotating head assembly 10 further includes a bypass circuit 90 constructed in accordance with the inventive concepts disclosed herein. In one embodiment, the bypass circuit 90 has an inlet 92, an outlet 94, a first bypass valve 96, a second bypass valve 102, and a one-way valve 105. The inlet 92 is connected to the hydraulic power circuit 70 so the inlet 92 is in fluid communication with the inlet 78 of the hydraulic motor 72 to receive a portion of the pressurized hydraulic fluid passing to the hydraulic motor 72 via the inlet 92. The outlet 94 is connected to the hydraulic power circuit 70 so the outlet 94 is in fluid communication with the outlet 80 of the hydraulic motor 72. In one embodiment, the inlet 92 of bypass circuit 90 and the inlet 78 of the hydraulic motor 72, and the outlet 94 of the bypass circuit 90 and the outlet 80 of the hydraulic motor 72 are connected by a series of hydraulic hoses. However, it will be appreciated that many methods of fluid communication and attachment exist, such as various pipes and hoses with clamps and couplings, that might serve this function and the inventive concepts disclosed herein are not limited to the disclosed attachment method.

The first bypass valve 96 and the second bypass valve 102 are interposed between the inlet 92 of the bypass circuit 90 and the outlet 94 of the bypass circuit 90 with the first bypass valve 96 positioned adjacent the first clamp member 44 and the second bypass valve 102 positioned adjacent the second clamp member 46. The first bypass valve member 96 may be connected to the body 12 so the first bypass valve 96 is fixed relative to the first clamp member 44. The first bypass valve 96 has a first actuator 100 positioned adjacent the first clamp member 44 so the first clamp member 44 engages the first actuator 100 to open the first bypass valve 96 when the first clamp member 44 is moved to the open position. Upon the first bypass valve 96 opening, the hydraulic fluid passes through the first bypass valve 96 to the second bypass valve 102.

The second bypass valve 102 may be connected to the body 12 so the second bypass valve 102 is fixed relative to the second clamp member 46. The second bypass valve 102 has a second actuator 104 positioned adjacent the second clamp member 46 so the second clamp member 46 engages the second actuator 104 to open the second bypass valve 102 when the second clamp member 46 is moved to the open position. Upon the second bypass valve 102 opening, the hydraulic fluid passes through the second bypass valve 102, through the one-way valve 105, and to the hydraulic power circuit 70. Because the hydraulic fluid now passes through the bypass circuit 90, the hydraulic fluid is caused to bypass the hydraulic motor 72 thereby deactivating the hydraulic motor 72.

The first bypass valve 96 and the second bypass valve 102 are positioned adjacent the first clamp member 44 and the second clamp member 46 to compensate for the first clamp member 44 and the second clamp member 46 not moving from the closed position to the open position in unison. The first clamp member 44 may reach the open position before the second clamp member 46 reaches the open position. By using the first bypass valve 96 and the second bypass valve 102, the hydraulic motor 72 remains activated until both the first bypass valve 96 and the second bypass valve 102 are engaged and opened.

If the first clamp member 44 and the second clamp member 46 move substantially in unison, only one bypass valve may be required. In this version, a bypass valve, such as the first bypass valve 96, may be positioned adjacent either the first clamp member 44 or the second clamp member 46 so the clamp member 46 engages the actuator of the bypass valve to open the bypass valve when the adjacent clamp member is moved to the open position. Upon the bypass valve opening, the hydraulic fluid passes through the bypass valve, through the one-way valve 105, and to the hydraulic power circuit 70 thereby deactivating the hydraulic motor 72.

The one-way valve 105 (i.e., check valve) is interposed between the second bypass valve 102 and the outlet 94 of the bypass circuit 90. The one-way valve 105 restricts the flow of hydraulic fluid to flow from the second bypass valve 102 to the outlet 94 of the bypass circuit 90. The one-way valve 105 prevents the flow of hydraulic through the bypass circuit 90 in the opposite direction when the hydraulic motor 72 is activated to move the first clamp member 44 and the second clamp member 46 from the open position to the closed position.

It will be appreciated the inventive concepts disclosed herein are not limited by the number of bypass valves. Any number of bypass valves may be used to effect deactivation of the hydraulic motor 72 upon the first clamp member 44 and the second member 46 being moved to the open position.

In another embodiment, at least one electric solenoid with a push button (not shown) may be used in place of the bypass circuit 90. For example, two electric solenoids may be positioned similar to the first bypass valve 98 and the second bypass valve 102. Further, the electric solenoids may be electrically connected to the pump 76 so the pump 76 is deactivated upon the first clamp member 44 and the second clamp member 46 engaging the electric solenoids.

Figure 6:
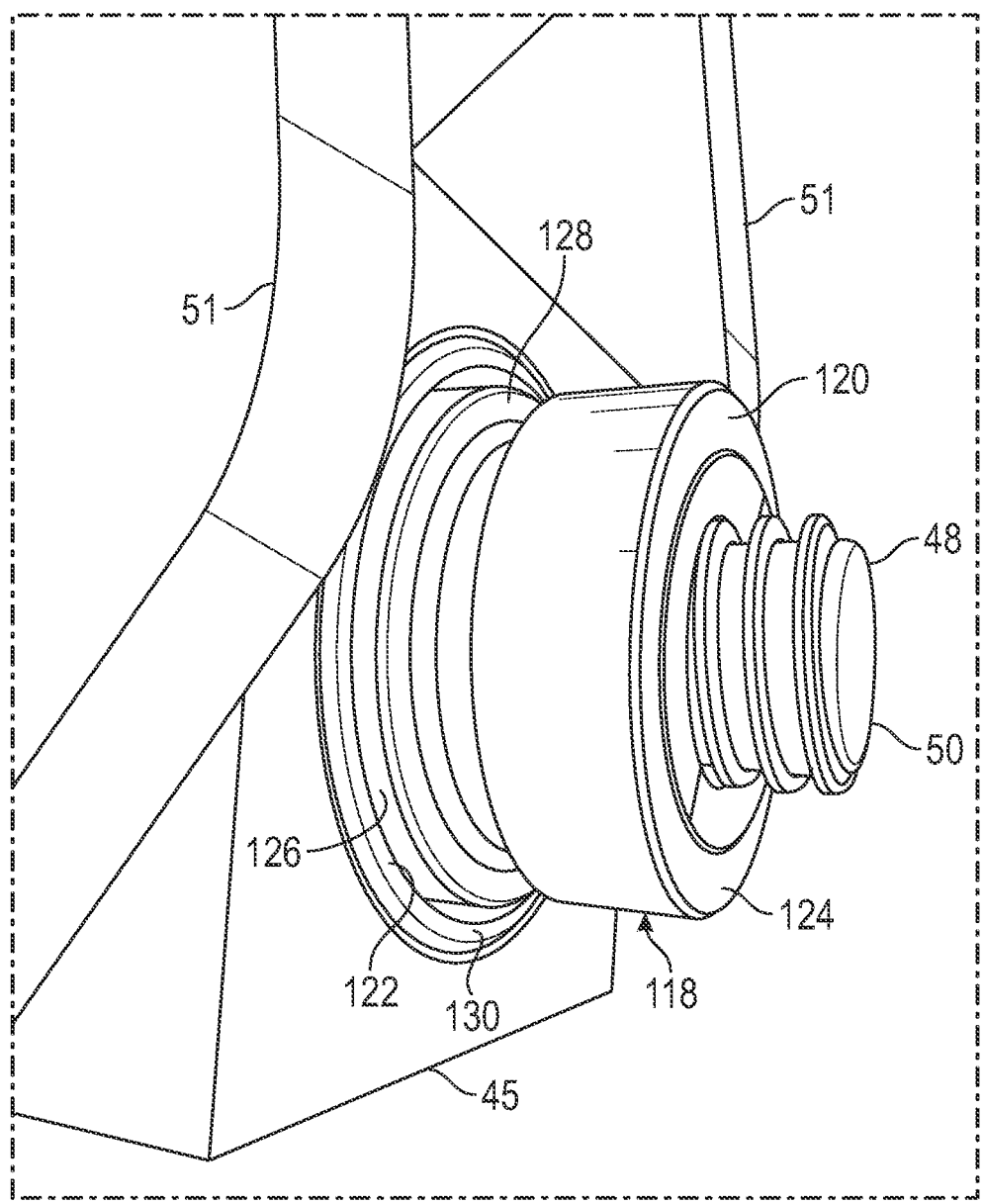
FIG. 6 is a perspective view of a thrust bearing.

In one embodiment, the clamp assembly 40 may further include a hard stop assembly 118 to prevent the first clamp member 44 and the second 46 from traveling beyond a selected position and backing-off the travel block 45 should the bypass circuit 90 fail to deactivate the hydraulic motor 72. As shown in FIGS. 3, 4, and 6, the hard stop assembly 118 may have a first portion 120 fixed to an end of the drive member 48 opposite the hydraulic motor 72 and a second portion 122 connected to the travel block 45. The first portion 120 may be a locking collar 124 positionable at a selected position along the drive member 48. The second portion 122 maybe a bearing 126, such as a thrust bearing, mounted in the travel block 45. In one embodiment, the bearing 126 may be press fit. The bearing has an inner race 128 and an outer race 130. The inner race 128 of the bearing 126 has an inner diameter greater than an outer diameter of the drive member 48 so the inner race 128 is in a non-contact relationship with the drive member 48. The inner race 128 is configured to matingly engage a portion of the locking collar 124.

The bearing 126 reduces the friction between the travel block 45 and the locking collar 124 upon contact. Without the bearing 126, the contact between the travel block 45 and the locking collar 124 can create sufficient friction to freeze or adhere the travel block 45 to the locking collar 124 so movement the travel block 45 along the drive member 48 along the drive member 48 in the opposite direction is impeded. With the bearing 126 in place, the travel block 45 is impeded by the locking collar 124 to stop the progress of the travel block 45 as the travel block 48 moves from the closed position to the open position. An operator will observe an increase in hydraulic pressure and deactivate the hydraulic motor 72. When ready, the operator may operate the hydraulic motor 72 to move the first clamp member 44 and the second clamp member 46 from the open position to the closed position. The reduced friction provided by the bearing 126 facilitates disengagement of the travel block 45 from the locking collar 124.

In use, when it is desired to move the clamp assembly 42 from the closed position to the open position. Upon the first clamp member 44 and the second clamp member 46 reaching the open position, the first clamp member 44 contacts the first actuator 100 of the first bypass valve 96 causing the first bypass valve 96 to open. Upon the first bypass valve 96 opening, the hydraulic fluid passes through the first bypass valve 96 to the second bypass valve 102.

Upon the second clamp member 46 contacting second actuator 104 of the second bypass valve 102, the second bypass valve 102 is caused to open. Upon the second bypass valve 102 opening, the hydraulic fluid passes through the second bypass valve 102, through the one-way valve 105, and to the hydraulic power circuit 70. Because the hydraulic fluid now passes through the bypass circuit 90, the hydraulic fluid is caused to bypass the hydraulic motor 72 thereby deactivating the hydraulic motor 72 due to the reduced hydraulic pressure.

When is it desired to move the clamp assembly from the open position to the closed position, the pump 76 is activated and the control valve 75 is positioned to cause the hydraulic motor 72 to rotate the drive member 48 in an opposite direction to cause the first clamp member 44 and the second clamp member 46 to move from the closed position to the open position. Upon the first clamp member 44 and the second clamp member 46 disengaging the first actuator 100 and the second actuator 104, respectively, the first bypass valve 98 and the second bypass valve close.

The hard stop assembly 118 is engaged only if the bypass circuit 90 fails to deactivate the hydraulic motor 72.

From the above description, it is clear that the inventive concepts disclosed herein are well adapted to carry out the objects and to attain the advantages mentioned herein, as well as those inherent in the invention. While exemplary embodiments of the inventive concepts have been described for purposes of this disclosure, it will be understood that numerous changes may be made which will readily suggest themselves to those skilled in the art and which are accomplished within the spirit of the inventive concepts disclosed and claimed herein.

What is claimed is:

1. A rotating head assembly, comprising:
   a body having a lower portion, an intermediate portion, an upper portion, and a bore extending entirely through the body from the upper portion to the lower portion, the lower portion connectable to a well bore, the intermediate portion having at least one opening in communication with the bore;
   an implement positioned in the bore of the body;
   a clamp assembly connected to the upper portion of the body, the clamp assembly having a first clamp member and a second clamp member movable between an open position wherein first clamp member and the second clamp member are spaced to permit the implement to be inserted into and removed from the body and a closed position wherein the first clamp member and the second clamp member are positioned to secure the implement in the body;
   a drive member threadingly connected to the first clamp member and the second clamp member;
   a hydraulic motor connected to the drive member in a way to cause the drive member to rotate in a selected direction to move the first clamp member and the second clamp member between the open position and the closed position, the hydraulic motor having an inlet connectable to a source of pressurized hydraulic fluid and an outlet; and
   a bypass circuit comprising:
      an inlet in fluid communication with the inlet of the hydraulic motor to receive a portion of the pressurized hydraulic fluid passing to the hydraulic motor;
      an outlet in fluid communication with the outlet of the hydraulic motor; and
      at least one bypass valve interposed between the inlet of the bypass circuit and the outlet of the bypass circuit, the bypass valve having an actuator positioned adjacent one of the first clamp member and the second clamp member so the bypass valve is caused to open when the one of the first clamp member and the second clamp member engages the actuator of the bypass valve, wherein upon the bypass valve being open, the pressurized hydraulic fluid is caused to bypass the hydraulic motor thereby deactivating the hydraulic motor.

2. The rotating head assembly of claim 1, wherein the drive member has an outer diameter, and wherein the rotating head further comprises a hard stop assembly having a first portion connected to the drive member and a second portion connected to the first clamp member, the second portion being a bearing having an inner race with an inner diameter greater than the outer diameter of the drive member so the inner race is in a non-contact relationship with the drive member, the inner race being matingly engageable with the first portion.

3. The rotating head assembly of claim 1, further comprising a one-way valve interposed between the inlet of the bypass circuit and the outlet of the bypass circuit to restrict the pressurized hydraulic fluid to flow in one direction.

4. The rotating head assembly of claim 1, wherein the bypass valve is connected to the body.

5. A rotating head assembly, comprising:
   a body having a lower portion, an intermediate portion, an upper portion, and a bore extending entirely through the body from the upper portion to the lower portion, the lower portion connectable to a well bore, the intermediate portion having at least one opening in communication with the bore;
   an implement positioned in the bore of the body;
   a clamp assembly connected to the upper portion of the body, the clamp assembly having a first clamp member and a second clamp member movable between an open position wherein first clamp member and the second clamp member are spaced to permit the implement to be inserted into and removed from the body and a closed position wherein the first clamp member and the second clamp member are positioned to secure the implement in the body;
   a drive member threadingly connected to the first clamp member and the second clamp member;
   a hydraulic motor connected to the drive member in a way to cause the drive member to rotate in a selected direction to move the first clamp member and the second clamp member between the open position and the closed position, the hydraulic motor having an inlet connectable to a source of pressurized hydraulic fluid and an outlet; and
   a bypass circuit comprising:
      an inlet in fluid communication with the inlet of the hydraulic motor to receive a portion of the pressurized hydraulic fluid passing to the hydraulic motor;
      an outlet in fluid communication with the outlet of the hydraulic motor;
      a first bypass valve interposed between the inlet of the bypass circuit and the outlet of the bypass circuit, the first bypass valve having an actuator positioned adjacent the first clamp member so the first bypass valve is caused to open when the first clamp member engages the actuator of the first bypass valve; and
      a second bypass valve interposed between the inlet of the bypass circuit and the outlet of the bypass circuit, the second bypass valve having an actuator positioned adjacent the second clamp member so the second bypass valve is caused to open when the second clamp member engages the actuator of the first bypass valve,
      wherein upon the first bypass valve and the second bypass valve being open, the pressurized hydraulic fluid is caused to bypass the hydraulic motor thereby deactivating the hydraulic motor.

6. The rotating head assembly of claim 5, wherein the drive member has an outer diameter, and wherein the rotating head further comprises a hard stop assembly having a first portion connected to the drive member and a second portion connected to the first clamp member, the second portion being a bearing having an inner race with an inner diameter greater than the outer diameter of the drive member so the inner race is in a non-contact relationship with the drive member, the inner race being matingly engageable with the first portion.

7. The rotating head assembly of claim 5, further comprising a one-way valve interposed between the inlet of the bypass circuit and the outlet of the bypass circuit to restrict the pressurized hydraulic fluid to flow in one direction.

8. The rotating head assembly of claim 5, wherein the first bypass valve and the second bypass valve are connected to the body.

9. A rotating head assembly, comprising:
   a body having a lower portion, an intermediate portion, an upper portion, and a bore extending entirely through the body from the upper portion to the lower portion, the lower portion connectable to a well bore, the intermediate portion having at least one opening in communication with the bore;
   an implement positioned in the bore of the body;
   a clamp assembly connected to the upper portion of the body, the clamp assembly having a first clamp member and a second clamp member movable between an open position wherein first clamp member and the second clamp member are spaced to permit the implement to be inserted into and removed from the body and a closed position wherein the first clamp member and the second clamp member are positioned to secure the implement in the body;
   a drive member threadingly connected to the first clamp member and the second clamp member;
   a hydraulic power circuit connected to the clamp assembly in a way to move the first clamp member and the second clamp member between the open position and the closed position, the hydraulic circuit comprising:
      a hydraulic motor connected to the drive member in a way to cause the drive member to rotate in a selected direction to move the first clamp member and the second clamp member between the open position and the closed position, the hydraulic motor having an inlet and an outlet;
      a source of hydraulic fluid in fluid communication with the inlet and the outlet of the hydraulic motor; and
      a pump interposed between the source of hydraulic fluid and the inlet of the hydraulic motor to supply pressurized hydraulic fluid to the hydraulic motor; and
   a bypass circuit comprising:
      an inlet in fluid communication with inlet of the hydraulic motor to receive a portion of the pressurized hydraulic fluid passing to the hydraulic motor;
      an outlet in fluid communication with the outlet of the hydraulic motor;
      a first bypass valve interposed between the inlet of the bypass circuit and the outlet of the bypass circuit, the first bypass valve having an actuator positioned adjacent the first clamp member so the first bypass valve is caused to open when the first clamp member engages the actuator of the first bypass valve; and a second bypass valve interposed between the inlet of the bypass circuit and the outlet of the bypass circuit, the second bypass valve having an actuator positioned adjacent the second clamp member so the second bypass valve is caused to open when the second clamp member engages the actuator of the first bypass valve, wherein upon the first bypass valve and the second bypass valve being open, the pressurized hydraulic fluid is caused to bypass the hydraulic motor thereby deactivating the hydraulic motor.

10. The rotating head assembly of claim 9, wherein the drive member has an outer diameter, and wherein the rotating head further comprises a hard stop assembly having a first portion connected to the drive member and a second portion connected to the first clamp member, the second portion being a bearing having an inner race with an inner diameter greater than the outer diameter of the drive member so the inner race is in a non-contact relationship with the drive member, the inner race being matingly engageable with the first portion.

11. The rotating head assembly of claim 9, further comprising a one-way valve interposed between the inlet of the bypass circuit and the outlet of the bypass circuit to restrict the pressurized hydraulic fluid to flow in one direction.

12. The rotating head assembly of claim 9, wherein the first bypass valve and the second bypass valve are connected to the body.

\* \* \* \* \*